Figure 1:
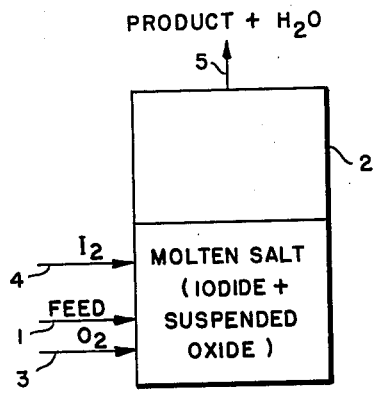
Figure 2:
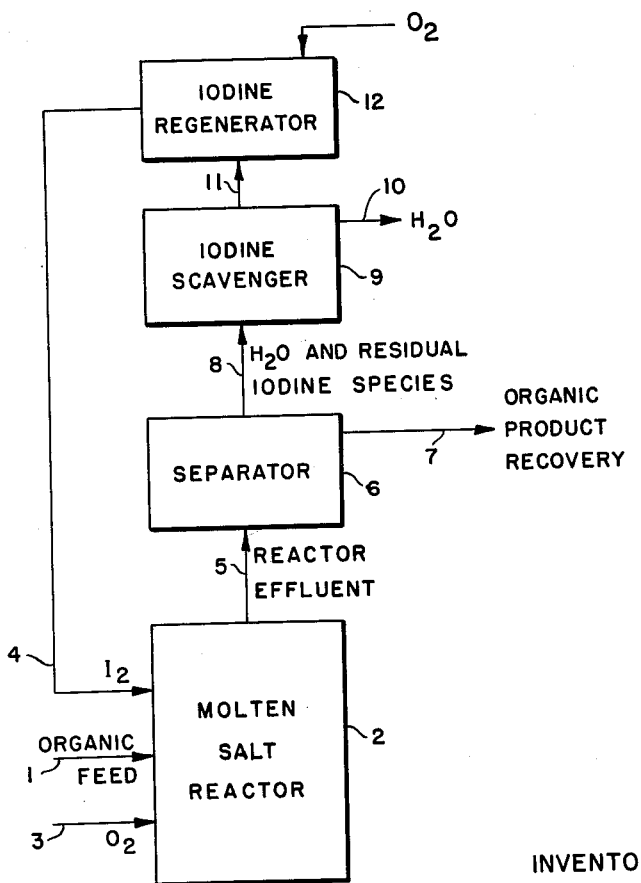

March 5, 1963  M. NAGER  3,080,435
DEHYDROGENATION PROCESS
Filed July 18, 1960

INVENTOR:
MAXWELL NAGER
BY: John H. Colvin
HIS ATTORNEY

United States Patent Office 3,080,435
Patented Mar. 5, 1963

3,080,435
DEHYDROGENATION PROCESS
Maxwell Nager, Pasadena, Tex., assignor to Shell Oil Company, New York, N.Y., a corporation of Delaware
Filed July 18, 1960, Ser. No. 43,647
12 Claims. (Cl. 260—673.5)

This invention relates to an improved process for the dehydrogenation of organic compounds. It relates more particularly to the dehydrogenation of hydrocarbons to less saturated hydrocarbons, i.e., hydrocarbons having a higher carbon-to-hydrogen ratio.

Various methods have been proposed for the dehydrogenation of organic compounds, including simply thermal dehydrogenation and catalytic dehydrogenation as well as chemical reaction with agents which cleave carbon-to-hydrogen bonds and combine with the hydrogen under the reaction conditions to form inorganic stable atom-to-hydrogen bonds, such as oxygen and chlorine. In some instances of chemical or chemical and catalytic dehydrogenation, using oxygen as the dehydrogenating agent oxygenation of the organic residue accompanies the dehydrogenation, as in the recently announced process of reacting propene with oxygen in contact with a bismuth molybdate catalyst to form propenal (acrolein).

Among recent developments which have been made in dehydrogenating organic compounds, there is one in which a mixture of the compound and a substantial proportion of elemental iodine in vapor phase is exposed to a temperature above 300° C. for a relatively short time. British Patent 793,214 describes this class of reaction. These dehydrogenation reactions include, for example, the conversion of paraffins to olefins and diolefins, of olefins to diolefins, of certain paraffins to aromatics (dehydrocyclization) and other reactions in which organic compounds are converted to other compounds having a higher carbon-to-hydrogen ratio, with the simultaneous conversion of the iodine to hydrogen iodide. These reactions proceed generally with high efficiency at the preferred reaction conditions. It is possible to reduce materially the amount of elemental iodine that must be charged for the organic reactant by reconverting some of the hydrogen iodide to elemental iodine while it is present in the reaction mixture at reaction conditions. For this purpose, it has been proposed to improve iodine utilization in such a process by adding oxygen together with the iodine to the dehydrogenation reaction zone to convert formed hydrogen iodide to iodine and water. However, although the efficiency of iodine utility is increased, the effluent mixture still contains iodine species which causes undesirable reactions unless the effluent mixture is rapidly quenched and requires special handling techniques.

It is the primary object of this invention to provide an improved process for the dehydrogenation of organic substances, and especially iodine-effected dehydrogenation, including dehydrocyclization and dehydroisomerization in addition to simple dehydrogenation. It is another object of the invention to provide a process of dehydrogenation with iodine wherein the use of a quench following the reaction is minimized or avoided and wherein the amount of iodine species in the reaction effluent is minimized or substantially avoided. It is a further object of the invention to provide such a process promoting a desirable shift in the equilibrium of the reaction mixture. These objects will be better understood and others will become apparent from the description of the invention which will be made with reference to the accompanying drawing, wherein:

FIGURE I is a schematic representation of the process steps of the invention in its simplest form, and FIGURE II is a simplified schematic representation of the process steps of the present invention in one alternative form.

Now, in accordance with the present invention, an improved process has been provided for the dehydrogenation of organic compounds containing CH groups by intimately contacting the organic compound in admixture with free oxgen with a molten metal iodide at an elevated temperature at which oxygen liberates free iodine from the metal iodide, the proportion of oxygen being at least sufficient to liberate an amount of iodine from the metal iodide to effect dehydrogenation of the added organic compound. The process is advantageously carried out by passing the organic compound in a gaseous state and free oxygen (admixed with the organic compound or separately) through a hot body of the molten metal iodide; the molten metal iodide preferably also contains, finely dispersed therein, either homogeneously as a solution therewith or heterogeneously as a finely dispersed liquid or solid therein, at least a substantial proportion of a metal oxide which is reactive with hydrogen iodide.

The metal iodide may be a single salt or a mixture of two or more metal iodides. The metal iodide may be used in admixture with other molten salts, which, of course, should be inert or non-reactive to the reactants and the metal iodide.

Although the exact nature of the reactions involved is not completely understood, the results of studies of the effect of varying different variables, such as contact time, relative proportion of oxygen, temperature, relative amounts of metal oxide used, etc., indicate that three different reactions are involved in the process: (a) reaction of oxygen with the metal iodide to form free iodine and the corresponding metal oxide; (b) reaction of the liberated free iodine with the dehydrogenatable organic substance to form hydrogen iodide and dehydrogenated organic substance, and (c) reaction of the hydrogen iodide with metal oxide to form metal iodide and water. Since the (b) reaction may be controlled in part by the concentration of free iodine, and this is dependent upon the proportion of oxygen, it is seen that the extent of the (b) reaction may be controlled indirectly by varying the proportion of oxygen delivered to the molten iodide mass. The proportion of oxygen added largely determines the course and extent of the other reactions including the formation of metal oxide, the release of iodine, the degree of dehydrogenation and the following formation of hydrogen iodide.

A number of advantages are obtained by the present process. Thus, whereas the iodinative dehydrogenation is endothermic, and when practiced independently requires that the heat of reaction be supplied from another source, the overall heat of the reactions involved in this process is exothermic, thereby avoiding the necessity of heat transfer to the reaction zone. Moreover, since the iodinative dehydrogenation reaction alone is equilibrium limited, rapid reaction of the hydrogen iodide with the metal oxide shifts the reaction to a higher dehydrogenation conversion of the organic substance; this is particularly valuable for the dehydrogenation of light hydrocarbons wherein the temperatures normally required for high equilibrium conversion are also conducive to thermal cracking. Furthermore, the maintenance of only a very low concentration of hydrogen iodide in the reaction zone eliminates, or substantially eliminates, the necessity for a rapid quench of the reactor effluent as well as the recovery and recycling of the relatively large amounts of iodine species normally required. Still further, the molten salt mass together with the in situ formation of the iodine, provides for a highly effective contacting of the iodine and the organic substance, for quickly bringing the organic substance to the desired reaction temperature, and provides an excellent heat transfer medium for transferring the excess heat from the reaction zone. Of course, mixtures of salts may be utilized which are either all in the molten state or wherein at least one is molten and the remainder are suspended in the molten plasma. In any case, the amount of solid or molten iodide present in the molten salt mixture is sufficient to provide, when oxidized, the necessary amount of iodine for reaction and also metallic oxide sufficient to substantially completely remove hydrogen iodide from the reaction mixture as it is formed.

Iodides and corresponding oxides useful in the process of the invention are particularly those which meet two criteria: (1) Iodides which are chemically and thermally stable but also convertible at the dehydrogenation temperature (especially 200–1000° C.) to the corresponding oxide by reaction with oxygen and (2) Corresponding oxides which form iodides by reaction with iodine species at the dehydrogenation temperature. These include especially arsenic, antimony, lead, zinc, cadmium, copper, nickel, cobalt, manganese, calcium, lithium and cerium and rare earth metals. With the additional injection of carbon dioxide (plus oxygen) certain carbonate-iodide fused salt systems may be employed. These include particularly barium or sodium carbonates and their corresponding iodides. The formation or additional injection of water makes possible the use of certain regeneratable hydroxides, such as lithium hydroxide. Whenever reference is made in the specification and claims to "oxide" it will be understood that carbonates and hydroxides are included as long as they meet the two criteria of ready regeneration under the conditions of dehydrogenation. Iodides are preferably present in substantial excess, i.e., sufficient to provide a molten salt phase in which dehydrogenation may take place and at the same time sufficient to provide a portion to be converted by oxidation to the corresponding metallic oxide. It is preferred that the mol proportion of the molten iodide to hydrocarbon in the reactor at any given time is maintained between about 2:1 and 100:1.

According to the process of the invention, dehydrogenation of the hydrocarbon in the molten salt environment is effected by the injection of oxygen to such an extent that sufficient iodine is regenerated from metal iodide to effect dehydrogenation of added organic compound and at the same time form an oxide in an amount sufficient to maintain the hydrogen iodide content of the system at an extremely low level (i.e., by reaction of HI with the metal oxide). By this is meant, a system in which the hydrogen iodide concentration is below a point at which it adversely affects the desirable reaction components. Usually, the system is such that hydrogen iodide exists only momentarily, being converted almost immediately to metal iodide. For the most part, the metallic oxides are solids and hence will exist as suspensions in the molten salt environment. It is preferred that the mol proportion of metallic oxide to metallic iodide be maintained between about 0.01:1 and about 0.5:1 so as to insure the substantially immediate conversion of hydrogen iodide (formed in the dehydrogenation reaction) to metallic iodide while still maintaining an essentially fluid system.

The proportion of oxygen injected into the system to form the optimum amount of metallic oxide may vary from about 0.1 mole of oxygen per mol of hydrocarbon to even as much as 100 mols of oxygen per mol of hydrocarbon. The proportion of oxygen employed is governed at least in part by the results desired. For example, if the feed is a gasoline and it is desired to convert only a limited proportion thereof to aromatics, the oxygen input is correspondingly restricted. The oxygen may be used in the pure state or admixed with inert diluents such as nitrogen or steam. Air may be utilized.

The use of such a system provides a number of advantages over the use of the corresponding solid metallic oxides and iodides. Thus, attrition of solids is no longer a problem. Liquid-gas contacting is extremely efficient. Melting points and vapor pressures of iodides are no longer limiting. In a molten salt system substantially all of the oxide and iodide is available for reaction. Finally, if the ceramic lining of the reactor should crack, molten salt would leak in, solidifying and sealing the crack thus preventing corrosive vapors from attacking the metal outer shell.

If the iodides or oxides (or their equivalents) exhibit high vapor pressures at the temperatures utilized, suitable recovery or condensing systems are desirable.

The invention will be best understood by reference to the drawing as follows: FIGURE I represents a most elementary and simple arrangement for use of the invention. According to FIGURE I, a feed is led by means of line 1 into a reactor 2 which is at least partially filled with a molten salt comprising essentially a metallic iodide. Oxygen is injected by means of line 3 into the reactor 2 for the primary purpose of converting at least part of the molten iodide into a suspended metallic oxide. Alternately, the oxygen can be admixed with the feed in line 1 rather than injected separately into the reactor. The temperature of the reactor is at least 200° C. so as to enable dehydrogenation to occur by reaction of the feed with iodine which is released upon conversion of the metallic iodide into the corresponding metallic oxide. Supplementary proportions of iodine species may be injected by means of line 4 to make up for any losses in iodine content which may occur. The effluent which is removed by means of line 5 from reactor 2 comprises the dehydrogenated feed and water with substantially no effective amount of iodine species.

FIGURE II shows a somewhat more elaborate arrangement of apparatus employing the same reactor 2, the feed line 1, the oxygen injection line 3 and the iodine injection line 4 as well as the reactor effluent line 5. According to FIGURE II, the reactor effluent is sent to a separator 6 wherein the organic product is separated and sent to recovery by means of line 7. The remaining aqueous phase comprises principally water and any residual iodine species which may have escaped being trapped by the hydrogen acceptor in the molten salt reactor 2. This mixture is sent by means of line 8 to an iodine scavenger area 9 wherein the iodine acceptor removes substantially all of the iodine species from the system and rejects water by means of line 10. The iodine scavenger may be such a material as a metallic oxide which performs the same function that it did in the molten salt reactor or it may be a reactive metal such as copper which immediately reacts with iodine species to form various copper iodides. These are then removed by means of line 11 to an iodine regenerator 12 wherein elemental iodine is regenerated and recycled to the molten salt reactor by means of recycle line 4.

In still another system, the dehydrogenation zone (contact of feed and iodine) may be segregated from the regeneration zone (contact of dehydrogenated product and iodine species with molten iodide and oxygen), the iodine formed in the latter zone being cycled back to the dehydrogenation zone.

In extensive studies it has been determined that the following hydrocarbons are iodine-reactive and are, at proper reaction conditions, converted by contact with elemental iodine into the indicated more unsaturated reaction products, generally in reactions of very high selectivity.

Hydroaromatic alicyclic compounds can be converted to the corresponding aromatic compounds by dehydrogenation. Compounds containing an aliphatic chain of at least 6 non-quaternary carbon atoms can be converted to aromatics by dehydrocyclization, as can cyclic compounds having an aliphatic chain or aliphatic chains capable of closing a ring of 6 carbon atoms. Compounds having an aliphatic chain of 2 to 5 non-quaternary carbon atoms and compounds having a ring of 5 carbon atoms can be converted by dehydrogenation into compounds having a greater number of carbon-to-carbon double bonds. Certain more saturated compounds may also be converted to compounds having acetylenic triple bonds, e.g. ethane or ethene to acetylene. Compounds which have an aliphatic chain of at least 5 or 4 carbon atoms, including respectively, 1 or 2 quaternary carbon atoms and which have no chain of 6 non-quaternary carbon atoms are converted, by reaction including conversion of a quaternary to a non-quaternary carbon atom, into different compounds having the same carbon number as the feed, followed, if residence time is sufficient, by conversion of the latter compounds in accordance with their new structure, e.g. into aromatics.

The invention is, for example, particularly suitable for the following conversion reactions:

(1) Methane to ethylene and acetylene (by coupling).
(2) Ethane to ethylene and acetylene.
(3) Ethylene to acetylene.
(4) Propane to propylene, methylacetylene or allene.
(5) Propane or propylene to benzene (by coupling and cyclization).
(6) Aliphatic compounds having from 4 to 5 contiguous non-quaternary carbon atoms in a chain to the corresponding olefins and diolefins, and particularly conjugated diolefins. This includes the following conversions: n-Butane to 1-butene, 2-butene and 1,3-butadiene; 1-butene or 2-butene to 1,3-butadiene; n-pentane to 1-pentene, 2-pentene and 1,3-pentadiene, 1-pentene or 2-pentene to 1,3-pentadiene isopentane to 3-methyl-1-butene, 3-methyl-2-butene, 2-methyl-1-butene and isoprene.
(7) Aliphatic hydrocarbons having a chain of at least 6 contiguous non-quaternary carbon atoms and having from 6 to 16 carbon atoms per molecule to aromatic hydrocarbons. This includes the following conversions: n-Hexane to benzene. Straight chain hexenes to benzene. n-Heptane to toluene and a small amount of benzene. Straight chain heptenes to toluene and a small amount of benzene. Monomethylhexanes to toluene. Monomethylhexenes to toluene. n-Octane to aromatics predominating in ethylbenzene and ortho-xylene. Straight chain octenes to aromatics predominating in ethylbenzene and orthoxylenes. Monomethylheptanes to monomethylheptenes to aromatics predominating in xylenes. Dimethylhexanes (DMH) other than geminal, i.e., 2,3-DMH, 2,4-DMH, 2,5-DMH and 3,4-DMH, as well as corresponding monoolefins, to xylenes; thus: 2,3-DMH and 3,4-DMH give ortho-xylene; 2,4-DMH give metaxylene and 2,5-DMH gives para-xylene. $C_{10}$ saturates containing no quaternary carbon atoms, and the corresponding olefins, to substituted monocyclic aromatics with predominantly saturated side chains. The following are illustrative: n-Decane to n-butylbenzene, propyltoluene, diethylbenzene, propylbenzene, ethylbenzene, toluene and benzene plus some of the corresponding compounds with side chain unsaturation. 5-methyl-nonane to n-butylbenzene, propyltoluene, 1,4-dimethyl-2-ethylbenzene (2-ethyl-p-xylene), m-ethyltoluene, p-xylene and toluene plus some of the corresponding compounds with side chain unsaturation.
(8) Aliphatic hydrocarbons having from 6 to 16 carbon atoms and having quaternary carbon atoms can also be converted to aromatics. Especially suitable are 2,2,4-trimethylpentane and 2,4,4-trimethylpentenes which are converted to xylenes, predominantly p-xylene.
(9) Non-hydroaromatic cycloparaffins and cycloolefins to corresponding cycloolefins and cyclodiolefins. For example: Cyclopentane to cyclopentene and cyclopentadiene-1,3. Cyclopentene to cyclopentadiene-1,3. Methylcyclopentane to 1-methyl-cyclopentene, 3-methylcyclopentene, 4-methylcyclopentene, 1-methylcyclopentadiene-1,3,2-methyl-cyclopentadiene-1,3 and 5-methylcyclopentadiene-1,3. Other methyl substituted cyclopentanes and cyclopentenes are similarly converted.
(10) Hydroaromatics to corresponding aromatics. For example: Cyclohexane to benzene. Methylcyclohexane to toluene. Ethylcyclohexane to ethylbenzene. 1,2-dimethylcyclohexane to xylene. 1,3-dimethylcyclohexane to m-xylene. 1,4-dimethylcyclohexane to p-xylene.
(11) Aromatics with alkyl side chains of 2 or more carbon atoms, especially those with 2 to 3 carbon atoms in the chain, to aromatics having unsaturated side chains. For example: Ethylbenzene to styrene. n-Propylbenzene to beta-methyl-styrene. Isopropylbenzene to alpha-methyl-styrene.
(12) Suitable organic compounds may be treated according to the process of this invention. These include alcohols, iodides, acids, nitriles, amines, etc. Species exemplifying these are isopropyl alcohol, propionitrile, octadecyl amine, butyric acid, hexyl iodide, etc.

Although the reaction of hydrocarbons with iodine is highly selective, differences have been observed between various hydrocarbons, both in the rate of reaction and in the selectivity to a particular compound. Thus, the rate at which olefins are converted to compounds having a higher degree of unsaturation, either diolefins or other olefinic compounds or aromatics, is considerably greater, often by a factor of 10 or more, than the rate of reaction of paraffins of the identical skeleton at otherwise equal conditions. It has also been found that the ideal length of the chain of contiguous non-quaternary carbon atoms in the aromatization of aliphatic compounds by dehydrocyclization is from 6 to 7 carbon atoms for the most efficient conversion of aromatics. When longer chains are aromatized the product contains not only aromatics of the same number of carbon atoms but also appreciable amounts of lower aromatics, formed by splitting off of short fragments, e.g., methyl or ethyl groups. Except for this latter effect of losing short fragments from aromatics, the reactions of the present invention are highly selective in producing a product having the same number of carbon atoms as the charge hydrocarbon. Thus, the present invention is not concerned with promotion of the cracking of hydrocarbons.

Of course, the dehydrogenation may be applied not only to single compounds but, more usually to technical mixtures thereof. Reforming operations, involving various gasolines, are contemplated.

The feed charged to the reaction mixture may be a pure iodine-reactive hydrocarbon in admixture with inert compounds. An inert compound, for example, nitrogen or steam, which is not converted under the conditions of this invention.

The oxygen may be employed as pure oxygen gas or diluted, e.g., air or oxygen diluted with helium or other inert gases.

The present invention can be carried out by passing a vaporized mixture of a hydrocarbon feed with at least 0.1 mol (preferably at least 0.5 mol) of elemental iodine per mol of hydrocarbon (preferably obtained internally by regeneration from the metallic iodide supplemented if necessary from external sources to make up for any losses) through a molten salt environment reaction zone maintained at a temperature above about 200° C. and preferably between about 450 and 800° C. Simultaneously a gas containing oxygen such as pure oxygen or air is added to the reaction zone in admixture with feed or at one or more spaced points in the molten salt reaction zone. The nominal residence time of the feed compound in the molten salt reaction zone is in the range from about 0.01 to 60 seconds.

The "Active iodine species" refers to the following compounds in the reaction mixture: iodine, hydrogen iodide and compounds which liberate either iodine or hydrogen iodide at reaction temperatures. The amount of iodine employed may, for convenience, be expressed in theories, 1 "theory" is the theoretically required amount of iodine, determined by the stoichiometry of the reaction, to convert one unit of feed compound to the favored dehydrogenation product. For example, to convert one gram molecular weight of normal hexane to benzene required 8 gram atomic weights or 4 gram molecular weights of elemental iodine. The number of theories of iodine species present in the reaction zone of the present invention is suitably in the range of from about 0.05 to 1.5, preferably from 0.1 to 0.8 theories exclusive of iodine present in the form of metallic iodides. The invention is further illustrated by the following examples:

Table 1, which follows, illustrates the results obtained by the use of a number of different metallic iodides in the dehydrogenation of propane to form propylene. It will be seen according to the table that conversions in the order of 50–80 percent were obtained with a selectivity to propylenes of 70–96 percent.

TABLE 1

Dehydrogenation of Propane Melt-Pot Reactor

| Salt | Salt load, g. | Flow rate, propane | Cc./min. air | Reactor temp., °F. | Cumulative run time, min. | Conversion, percent m. | Selectivity, percent m. |
|---|---|---|---|---|---|---|---|
| LiI | 34 | 20 | 50 | 850 | 5 | 79 | 88 |
|  |  |  |  |  | 21 | 75 | 90 |
|  |  |  |  |  | 84 | 67 | 91 |
|  |  |  |  |  | 165 | 62 | 95 |
|  |  |  |  |  | 200 | 60 | 96 |
| PbI$_2$ | 30 | 20 | 50 | 950 | 40 | 50 | 89 |
|  |  |  |  | 1,000 | 60 | 52 | 91 |
|  |  |  |  | 1,050 | 80 | 53 | 86 |
| ZnI$_2$ | 48 | 20 | 50 | 800 | 15 | 34 | 69 |
| CdI$_2$ | 100 | 20 | 50 | 900 | 104 | 48 | 87 |

Table 2 illustrates the results obtained by the dehydrogenation of ethane using three different salt oxide systems. Again it will be seen that high conversions and high selectivity to ethylene were obtained.

According to the results given in Table 2, all three of the iodides tested exhibited an increase in selectivity with increased conversions.

TABLE 2

Dehydrogenation of Ethane

| Reactor type | Melt-pot | | | | | | | | |
|---|---|---|---|---|---|---|---|---|---|
| Salt | ← LiI → | | | ← PbI$_2$ → | | | | ← CdI$_2$ → | |
| Load, g | ← a 60.0 → | | | ← 40.0 → | | | | ← 40.0 → | |
| Hydrocarbon feed | ← Ethane → | | | | | | | | |
| Feed rate, cc./min | ← 20 → | | | | | | | | |
| Air rate, cc./min | ← 50 → | | | | | | | | |
| Cumulative run time, min | 60–120 | 180 | 240 | 0–60 | 120 | 180 | 240 | 120–180 | 240 |
| Reactor temperature, °F | 1,000 | 1,050 | 1,100 | 950 | 1,000 | 1,050 | 1,100 | 1,050 | 1,100 |
| Products, percent m., basis feed ethane: | | | | | | | | | |
| Methane | 1.2 | 1.3 | 1.3 | 0.1 | 1.8 | 2.1 | 2.1 | 0.3 | 0.7 |
| Ethylene | 43.5 | 61.0 | 75.0 | 11.3 | 27.4 | 51.5 | 67.8 | 17.5 | 31.2 |
| Ethane | 50.8 | 34.4 | 21.9 | 82.7 | 65.0 | 41.2 | 25.2 | 79.5 | 64.8 |
| Propylene | 0.1 | 0.2 | 0.1 | 0.1 | 0.2 | 0.2 | 0.2 | 0.1 | 0.1 |
| Propane | 1.6 | 0.8 | 0.5 | 0.9 | 0.9 | 0.2 | 0.6 | 0.3 | 0.4 |
| Butadiene | 0.2 | 0.1 | 0.1 |  | 0.1 |  | 0.3 | 0.2 | 0.1 |
| CO | 1.8 | 1.1 | 1.1 | 4.2 | 3.9 | 3.6 | 2.6 | 1.0 | 1.5 |
| CO$_2$ | 0.8 | 1.1 | 0.7 | 0.7 | 0.7 | 1.2 | 1.2 | 1.2 | 1.2 |
| Conversion, percent m | 49 | 66 | 78 | 17 | 35 | 59 | 75 | 21 | 35 |
| Selectivity, percent m | 88 | 92 | 96 | 65 | 78 | 88 | 91 | 85 | 89 |
| Oxygen used, percent m | 74 | 72 | 88 | 18 | 49 | 63 | 85 | 23 | 38 | a 60 g. LiI·3H$_2$O dehydrates to 43 g. LiI.

Table 3, which follows, gives further data on the conversion of ethane to ethylene utilizing lithium iodide and lead iodide respectively in molten salt systems. In these experiments care was taken to obtain optimum contact of the ethane and oxygen introduced together and furthermore the apparatus was designed to maintain maximum agitation of the metallic oxide formed during the reaction. Best results were obtained by using slightly less than an equivalent amount of oxygen based on hydrocarbon so as to minimize loss or iodine or iodine species from the reactor. By increasing the ethane to a five percent excess iodine loss was held to a minimum.

TABLE 3

Dehydrogenation of Ethane in a Riser Reactor

| Reactor type | Riser | | Riser-pump | |
|---|---|---|---|---|
| Salt | LiI | | PbI$_2$ | |
| Load, g | a 155 | | 300 | |
| Oxide | Li$_2$O | | PbO | |
| Load, g | b 15.6 | | 25 | |
| Hydrocarbon feed | ← Ethane → | | | |
| Feed rate, cc./min | 53 | 75 | 35 | 70 |
| Air rate, cc./min | 125 | 110 | 130 | 110 |
| Excess ethane, percent m | 5 | 70 | −33 | 60 |
| Reactor temperature, °F | 1,100 | 1,100 | 1,100 | 1,100 |
| Run time, min | 90 | 45 | 90 | 120 |
| Products, percent m., basis feed ethane: | | | | |
| Methane | 2.0 | 1.4 | 1.5 | 1.5 |
| Ethylene | 93.7 | 56.4 | 84.5 | 54.3 |
| Ethane | 2.5 | 41.4 | 7.6 | 40.3 |
| Propylene | 0.3 | 0.2 |  | 0.2 |
| Propane |  |  |  | 1.4 |
| Butadiene | 0.8 | 0.3 | 0.3 |  |
| CO |  |  | 2.4 |  |
| CO$_2$ | 0.7 | 0.3 | 3.7 | 2.3 |
| Conversion, percent m | 98 | 59 | 92 | 60 |
| Selectivity, percent m | 96 | 96 | 91 | 91 |
| HI loss, c percent m | 0.10 | 0.10 | 0.08 | 0.04 |
| Oxygen used, percent m | 100 | 100 | 91 | 97 | a 155 g. LiI·3H$_2$O dehydrates to 111 g. LiI.
b 25 g. LiOH was used which equals 15.6 g. Li$_2$O.
c HI loss is based on the oxygen input rate. Accuracy of this determination is ±0.02%.

Table 4, which follows, illustrates the results obtained when using a mixture of molten lithium iodide in which is suspended lithium oxide. According to this table it will be seen that a study was made at 1050° F. using various air/butane ratios. At the stoichiometric ratio (5 volumes of air per volume of butane) a conversion of 75 percent was obtained with butadiene and mixed butylene selectivities of 68 percent and 5 percent, respectively. Various other products such as ethylene, propylene, cyclohexene, benzene, toluene, etc., accounted for the remaining oxygen fed, since oxygen utilization was 100 percent. By increasing the air/butane ratio to 6, conversion was increased to 84 percent and at a ratio of 7 conversion was 92 percent. Butadiene selectivity increased somewhat as total flow increased and oxygen utilization remained at 100 percent. Small amounts of cyclohexene, benzene and toluene were noted in the product. These indicate that a limited amount of a coupling reaction was occurring. Coke make (data not shown) was small.

When isobutane was used rather than normal butane, entirely different results were obtained as will be seen by reference to Table 4. The principal product was isobutene and there were no normal butenes or butadiene produced. At 1050° F., one second residence time, with an air/isobutane ratio of 5, conversion was 75 percent and selectivity 87 percent with negligible coke formations. This particular isobutane feed was technical grade (95 percent molar purity) and contained 4 percent propane. The presence of small but significant amounts of benzene and toluene in the product shows that a coupling reaction with propane or propane-isobutane mixtures occurs.

Table 4 also shows the results obtained by similar treatment of isopentane and of 2-methylbutene-1 for producing isoprene. At 1050° F. a 95 percent conversion of isopentane was obtained, with isoprene and isoamylene selectivities of 58 percent and 13 percent, respectively. Conversion of 2-methylbutene-1 to isoprene was more successful, conversion at 1050° F. being 71 percent and selectivity 92 percent.

The data contained in Table 5 which follows indicates that a residence time of about 5 seconds enhances coupling reaction and, consequently, benzene was obtained in substantial yields in addition to the primary product, propylene, propane being the feed material. With an air/propane ratio of 4.4 at 1050° F., conversion was 83 percent. Propylene selectivity was 71 percent and benzene selectivity was 15 percent for a combined selectivity of 86 percent. As Table 5 shows, propylene is an even better starting material for benzene production. At 1050° F. conversion was 81 percent and selectivity 73 percent for a benzene yield of 59 percent.

TABLE 4
*Dehydrogenation in a Riser Reactor*

| Reactor type | Riser | | | | | | | | |
|---|---|---|---|---|---|---|---|---|---|
| Salt | ←—————————————————— LiI ——————————————————→ | | | | | | | | |
| Load, g | ←—————————————————— 111 ——————————————————→ | | | | | | | | |
| Oxide | ←—————————————————— Li₂O —————————————————→ | | | | | | | | |
| Load, g | ←—————————————————— 8.9 ——————————————————→ | | | | | | | | |
| Hydrocarbon feed | ←——— n-Butane ———→ | | | ←——— Isobutane ———→ | | | ←— Isopentane —→ | | (¹) |
| Feed rate, cc./min | ←——— 50 ———→ | | | ←——— 50 ———→ | | | ² 20 | ² 30 | ² 70 |
| Air rate, cc./min | 250 | 300 | 350 | 125 | 175 | 250 | 250 | 250 | 225 |
| | | | | | | | 1,000 | 1,050 | 1,050 |
| Reactor temperature, °F | ←——— 1,050 ———→ | | | ←——— 1,050 ———→ | | | | | |
| Product, percent m, basis feed: | | | | | | | | | |
| Methane | 2.6 | 3.0 | 2.2 | 2.0 | 1.9 | 2.6 | 2.3 | 4.1 | 0.6 |
| Ethylene | 4.5 | 5.8 | 5.5 | | | | 2.2 | 4.1 | 0.5 |
| Ethane | 1.9 | 1.9 | 1.6 | 0.1 | | | 0.4 | 0.6 | 1.0 |
| Propylene | 7.9 | 8.1 | 5.6 | 5.3 | 5.5 | 3.6 | 3.6 | 4.1 | |
| Propane | | | | 1.2 | 1.1 | | | | |
| Butadiene | 51.1 | 56.4 | 69.3 | | | | 8.3 | 10.3 | 1.6 |
| Butylenes | 3.6 | 3.6 | 2.1 | ³ 51.5 | 56.1 | 65.3 | 0.4 | 0.5 | 0.3 |
| Isobutane | | | | 33.9 | 31.0 | 21.5 | | | |
| n-Butane | 25.1 | 16.2 | 8.4 | | | | 5.8 | 12.2 | 28.7 |
| Isoamylenes | | | | | | | 26.3 | 5.3 | |
| Isopentane | | | | | | | 47.4 | 55.2 | 65.3 |
| Isoprene | | | | | | | | | |
| Cyclohexene | 0.8 | 0.9 | 0.6 | | | | 1.3 | 0.8 | 0.3 |
| Benzene | 0.9 | 1.3 | 1.1 | 0.4 | 0.3 | 0.4 | 0.3 | | |
| Toluene | 0.4 | 0.4 | 0.4 | 0.6 | 0.4 | 0.8 | 0.6 | 2.8 | 1.5 |
| CO | 1.0 | 1.5 | 1.6 | 1.9 | 1.3 | 2.0 | 1.1 | | 0.2 |
| CO² | 0.2 | 0.9 | 1.6 | 3.1 | 2.4 | 3.9 | | | |
| Conversion, percent m | 75 | 84 | 92 | 63 | 66 | 75 | 74 | 95 | 71 |
| Selectivity, percent m.: | | | | | | | | | |
| Butadiene | 68 | 67 | 76 | | | | | | |
| Butylenes | 5 | 4 | 2 | ³ 78 | 85 | 87 | | | |
| Isoprene | | | | | | | 64 | 58 | 92 |
| Isoamylenes | | | | | | | 8 | 13 | |
| Σ | 73 | 71 | 78 | 78 | 85 | 87 | 72 | 71 | 92 |
| Oxygen used, percent | ←——— 100 ———→ | | | ←——— 100 ———→ | | | 100 | 100 | 98 |

¹ 2-methylbutene-1.   ² Calculated gas volume at STP.   ³ Iso.

TABLE 5
*Dehydrogenation of Propane and Propylene*

| Reactor type | Riser | | | | | | | | Melt-Pot | | |
|---|---|---|---|---|---|---|---|---|---|---|---|
| Salt | ←————————————— LiI —————————————→ | | | | | | | | LiI | | |
| Load, g | ←————————————— 111 —————————————→ | | | | | | | | 25 | | |
| Oxide | ←————————————— Li₂O ————————————→ | | | | | | | | Li₂O | | |
| Load, g | ←————————————— 8.9 —————————————→ | | | | | | | | 1.3 | | |
| Hydrocarbon feed | ←——————————— Propane ———————————→ | | | | | | (¹) | (²) | ←— Propane —→ | | |
| Feed rate, cc./min | ³ 100 | ³ 100 | ³ 80 | ⁴ 80 | ³ 80 | ⁴ 80 | 80 | 50 | 20 | 20 | 20 |
| Air rate, cc./min | 250 | 250 | 250 | 350 | 200 | 200 | 250 | 125 | 100 | 100 | 100 |
| | | | | | | | | | | 60 | ⁵ 120 |
| Reactor temperature, °F | 1,000 | 1,050 | 1,050 | 1,050 | 1,050 | 1,050 | 1,200 | 1,050 | 1,050 | 1,050 | 1,050 |
| Products, percent m., basis feed: | | | | | | | | | | | |
| Methane | 0.8 | 1.3 | 1.4 | 2.0 | 1.2 | 2.2 | 6.2 | 2.5 | 1.8 | 1.6 | 1.6 |
| Ethylene | 0.5 | 1.0 | 1.7 | 4.0 | 0.8 | 3.6 | 13.6 | 8.0 | 3.7 | 3.2 | 3.4 |
| Ethane | 0.3 | 0.3 | 1.7 | 1.6 | 1.4 | 0.3 | 0.7 | | 0.3 | 0.3 | 0.3 |
| Propylene | 38.4 | 49.2 | 53.7 | 58.4 | 45.1 | 43.8 | 42.4 | 19.4 | 52.1 | 54.6 | 53.6 |
| Propane | 55.4 | 42.7 | 31.9 | 17.2 | 46.7 | 44.5 | 1.9 | | 25.7 | 19.0 | 19.0 |
| Butadiene | 0.5 | 1.0 | 1.0 | | 0.7 | 0.3 | 1.0 | | 0.3 | 0.3 | 0.2 |
| Cyclohexene | 0.7 | 1.0 | 1.2 | | 0.8 | | | | | | |
| Benzene | 2.4 | 2.8 | 5.9 | 11.9 | 2.6 | 4.3 | 29.1 | 58.6 | 8.6 | 11.3 | 12.2 |
| CO | 1.0 | 0.7 | 1.3 | | 0.5 | 0.8 | 4.8 | | 2.7 | 3.7 | 3.5 |
| CO₂ | | | 0.2 | 4.9 | 0.1 | 0.2 | 0.4 | 11.5 | 4.8 | 6.0 | 6.2 |
| Conversion, percent m | 45 | 57 | 68 | 83 | 53 | 56 | 98 | 81 | 74 | 81 | 81 |
| Selectivity, percent m.: | | | | | | | | | | | |
| Propylene | 86 | 86 | 79 | 71 | 85 | 79 | 43 | | 70 | 68 | 66 |
| Benzene | 5 | 5 | 9 | 15 | 5 | 8 | 30 | 73 | 12 | 14 | 15 |
| Σ | 91 | 91 | 88 | 86 | 90 | 87 | 73 | 73 | 82 | 82 | 81 |
| Oxygen used, percent m | 91 | 99 | 99 | 100 | 99 | 100 | 99 | 99 | 100 | 100 | 100 |

¹ Methane and propane, 50-50 percent m. mixture, yields basis propane only.   ² Propylene.   ³ Propane feed into bell top, air feed into riser.   ⁴ Propane and air feed into riser.   ⁵ He rate, cc./min.

Table 6 shows the results obtained by treatment of various feeds with oxygen in a molten lithium iodide-lithium oxide mixture. The following results are of special importance:

(1) Dehydrocyclization of alkanes and alkenes resulted in the formation of aromatics and cycloolefins.
(2) Aromatics are obtained by dehydrogenation of cycloalkane.
(3) Unsaturation of the side chain resulted in the formation of styrene from ethylbenzene.
(4) Acrylonitrile was the principal conversion product of propionitrile.

carbon-to-hydrogen ratio by means of reaction with iodine in the presence of a molten metallic iodide comprising the steps of (1) admixing a hydrocarbon with a molten metallic iodide containing suspended metallic oxide and iodine at a temperature in excess of 200° C. wherein the first hydrocarbon is dehydrogenated into the second hydrocarbon, hydrogen iodide is formed and reacts with metallic oxide to form metallic iodide, (2) separating the metallic iodide from the hydrocarbon product, (3) reacting metallic iodide from step (2) with oxygen to generate metallic oxide and iodine suspended in excess molten metallic iodide and (4) recycling the suspension

TABLE 6

| Feed | n-Heptane | Hexene-1 | Cyclohexane | Cyclohexane | Ethylbenzene | Propionitrile |
|---|---|---|---|---|---|---|
| Temperature, °F | 1,000 | 990 | 980 | 1,050 | 1,010 | 1,000. |
| Pressure, p.s.i.g | 2.1 | 2.2 | 3.0 | 3.0 | 2.3 | 2.3. |
| Composition of melt: | | | | | | |
| $Li_2O$, percent w | 0 | 0.5 | 0.5 | 0.5 | 0.5 | 0.5. |
| $Li I$, percent w | 100 | 99.5 | 99.5 | 99.5 | 99.5 | 99.5. |
| $N_2$, cc./min | 60 | 60 | 170 | 170 | 60 | 100. |
| $O_2$, cc./min | 50 | 58 | 69 | 45 | 24 | 20. |
| Feed rate, cc./hour | 13.3 | 16.04 | 16.04 | 16.04 | 16.04 | 9.2. |
| $O_2$/feed ratio, mol | 1.5 | 1.05 | 1.5 | 1.0 | 0.45 | 0.41. |
| Composition of liquid products. | $C_5$ & $C_6$, 6.0; benzene, 15; n-heptane, 28; toluene, 51. | Benzene, 90; cyclohexene, 1; hexenes plus hexanes, 9. | Benzene, 64; cyclohexane, 36. | Benzene, 45; cyclohexane, 52; methylcyclopentane, 3. | Ethylbenzene, 23; styrene, 77. | Propionitrile, 65; acrylonitrile, 25; unidentified, 10. |

I claim as my invention:

1. In the process for the dehydogenation of a first organic compound to at least a second organic compound having a higher carbon-to-hydrogen ratio, wherein the first compound and a reactive iodine species are reacted at a temperature in excess of 200° C. whereby the second compound and hydrogen iodide are produced, the improvement comprising conducting the reaction in a molten salt environment, the molten salt comprising at least one metallic iodide, and injecting oxygen into the molten salt environment and thereby liberating iodine from the metallic iodide to provide iodine for the aforesaid reaction.

2. A process for dehydrogenating a first hydrocarbon into a second hydrocarbon having a higher carbon-to-hydrogen ratio which comprises contacting a mixture comprising the first hydrocarbon with a reactant iodine species in sufficient amount to furnish at least 0.05 mole of iodine per mole of first hydrocarbon at a temperature of at least 200° C. to effect a carbon-to-hydrogen bond cleavage in the first hydrocarbon, contact of the reactant iodine species and the first hydrocarbon being in a body of molten salt comprising a molten metallic iodide, and introducing oxygen into said molten salt environment and thereby liberating iodine from the metallic iodide to provide iodine for the aforesaid contacting with the first hydrocarbon.

3. An improved process for dehydrogenating a first hydrocarbon into a second hydrocarbon having a higher of metallic oxide and iodine in molten metallic iodide to step (1) of the process.

4. A process according to claim 1 wherein the metallic iodide is lead iodide.

5. A process according to claim 1 wherein the metallic iodide is lithium iodide.

6. A process according to claim 1 wherein the metallic iodide is cadmium iodide.

7. A process according to claim 1 wherein the first compound is butane.

8. A process according to claim 1 wherein the first compound is heptane.

9. A process according to claim 1 wherein the first compound is a hydrocarbon in the gasoline boiling range.

10. A process according to claim 1 wherein the first compound is a saturated aliphatic hydrocarbon having from 1 to 16 carbon atoms per molecule.

11. A process according to claim 1 wherein the first compound is ethane.

12. A process according to claim 1 wherein the first compound is propane.

References Cited in the file of this patent

UNITED STATES PATENTS

| | | |
|---|---|---|
| 2,868,771 | Ray et al. | Jan. 13, 1959 |
| 2,868,772 | Ray et al. | Jan. 13, 1959 |
| 2,879,300 | Cheney et al. | Mar. 24, 1959 |
| 2,890,253 | Mullineaux et al. | June 9, 1959 |